UNITED STATES PATENT OFFICE.

NELSON B. ARNOLD, OF WESTFIELD, NEW JERSEY.

PAINT COMPOSITION.

952,863.

No Drawing.

Specification of Letters Patent. Patented Mar. 22, 1910.

Application filed May 25, 1909. Serial No. 498,186.

*To all whom it may concern:*

Be it known that I, NELSON B. ARNOLD, a citizen of the United States, residing at Westfield, in the county of Union and State of New Jersey, have invented new and useful Improvements in Paint Compositions, of which the following is a specification.

This invention relates to an improved paint composition designed particularly for use as a finish for walls and ceilings.

The primary object of the invention is the provision of a wall finish which will present a smooth, flat, and washable surface, free from all glazed spots, and which may be as readily and conveniently applied as any ordinary paint composition, and from which grease and other stains may be readily removed.

The composition is composed primarily of a pigment and a vehicle therefor, combined in the proportions of about 70 per cent. pigment and 30 per cent. vehicle. The pigment is composed of about 73 per cent. lithopone and 27 per cent. extender comprising calcium sulfate and calcium carbonate. By lithopone I mean an admixture of about 30 per cent. of zinc sulfid and 70 per cent. of sulfate of barium which must be conjointly precipitated in water. The vehicle is preferably of about 33 per cent. linseed oil and 67 per cent. varnish.

I have found that the highly desirable results obtained by my invention require that the pigment be composed of zinc sulfid and sulfate of barium conjointly precipitated in about the proportions stated.

The composition may be readily and easily applied to walls, and presents a flat, delicate finish free from glazed spots, and may be subjected to hard usage without destroying its appearance so long as its physical properties are not affected.

I claim as my invention:

1. A flat finish composition consisting of about 70 per cent. pigment and 30 per cent. vehicle, the pigment being composed of lithopone and an extender comprising calcium sulfate and calcium carbonate ground in the vehicle.

2. A flat finish composition consisting of about 70 per cent. pigment and 30 per cent. vehicle, the pigment being composed of about 73 per cent. lithopone and 27 per cent. extender, the latter comprising calcium sulfate and calcium carbonate, and the vehicle being composed of oil and varnish in which the pigment is ground.

In testimony whereof I affix my signature in presence of two witnesses.

NELSON B. ARNOLD.

Witnesses:
T. M. LYNNCH,
H. P. SCHORNBERNER.